Figure 1:
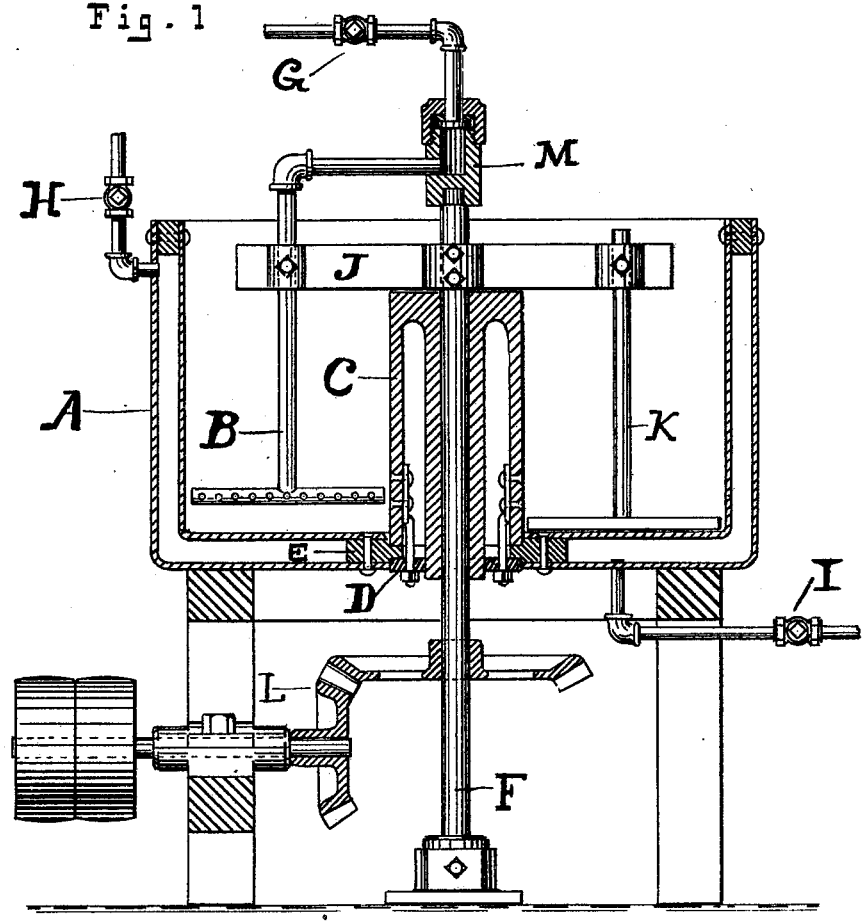

A. B. LAWTHER.
Machine for Treating Oleaginous Seeds for the Extraction of Oil.

No. 202,839. Patented April 23, 1878.

WITNESSES:
J. C. Wilckie
Charles L. Bonney.

INVENTOR:
Alfred B. Lawther

UNITED STATES PATENT OFFICE.

ALFRED B. LAWTHER, OF CHICAGO, ILLINOIS.

IMPROVEMENT IN MACHINES FOR TREATING OLEAGINOUS SEEDS FOR THE EXTRACTION OF OIL.

Specification forming part of Letters Patent No. 202,839, dated April 23, 1878; application filed November 30, 1877.

*To all whom it may concern:*

Be it known that I, ALFRED B. LAWTHER, of Chicago, in the county of Cook and State of Illinois, have invented a new and improved apparatus and process for the more perfect moistening of oleaginous seeds, or the meal thereof, in any suitable state of preparation, for the extraction of the oil therefrom; and that the following is a description of my said invention, by means whereof any person skilled in the art may use and apply my said apparatus and process.

My invention relates to that class of machines in which a perforated stirrer, communicating moisture in some form, is made to revolve within a suitable reservoir, so as to moisten and mix the contents, usually consisting of meal from crushed flaxseed.

I refer particularly to machines of that character invented by myself, and described in previous Letters Patent issued to me, and especially Letters Patent No. 163,933 of the United States of America, dated on or about June 1, A. D. 1875, and Letters Patent of Great Britain, No. 319, dated on or about January 26, 1876.

My present invention consists, chiefly, in an improvement on the previous invention described in said American Letters Patent.

In the course of my experience I have found it advantageous to place a perforated stirrer, in a horizontal position, parallel to and a short distance above the bottom of the reservoir for the seed or meal. I have also found it advantageous to arrange the perforated portion of the stirrer radially, or nearly so, in the reservoir, and to have such stirrer as long as the inner radius of the reservoir would conveniently admit, for the purpose of securing the action of the moisture as nearly as practicable, upon the whole body of the seed or meal.

In operating this arrangement on a large scale I have found that the seeds near the center of the reservoir tend to adhere together and form lumps and balls of various sizes, which generally prove too wet for the best results, and which, when put into the press, do not yield the proper amount of oil, owing to the imperfect preparation of the meal. I have found that this lumping of the meal also causes the oil-cake to have a spotted appearance, which detracts from its general aspect and market value.

I have discovered that the defects and irregularities above specified were caused by the jets of steam or other moisture communicated through the perforated stirrer coming directly in contact with the crushed seeds with such local intensity as to overwet small portions thereof, thus forming a nucleus of the above-mentioned balls and lumps.

I have further discovered that by giving the perforated stirrer a suitably-increased rate of speed through the mass of meal or crushed seed the same would be prevented from falling too quickly into the cavity formed momentarily directly in the rear of the stirrer, and that the jets of steam would then naturally force themselves into such cavity, expand, and fill the same, thus securing the more complete and uniform moistening of the meal. The rapid action of the stirrer will continuously form the cavity above referred to, and the same, after being first filled with the expanding steam, will be as continuously destroyed by the falling in of the particles of seed or meal; and it is obvious that the fresh surface of seed or meal will thus be momentarily exposed to the action of the steam, and thus be uniformly and suitably moistened. The requisite degree of velocity cannot be stated mathematically, because it depends upon the size of the reservoir, and the quantity of the seed or meal and the condition of the same, and the size and form of the stirrer; but the skilled workman will find no difficulty in speedily ascertaining, by a little practice, what rate of velocity will in his particular machine produce the best results. Too slow a velocity leads, as above shown, to overwetting, while too great a velocity would not allow time for proper moistening.

In the course of my experiments and experience I have also discovered that a radially-placed perforated steam-stirrer, reaching nearly to the center of the reservoir, and moving with the necessary velocity to moisten the meal at its outer end, would move too slowly at the center to secure the desired result, and would so lead to the overwetting and lumping above described.

To overcome this defect and difficulty, and to secure the proper velocity for the whole body of the meal or seed, I have made and perfected the further discovery and invention of shortening the perforated stirrer; and, in order to keep the meal or seed away from the center of revolution, I construct around the same a hub of convenient size and body, extending upward nearly to the top of the reservoir. This hub may also serve as a bearing for the shaft, to which the stirrer-arms and stirrer are attached. No exact proportion between the diameters of the hub and the reservoir need be observed; but the ratio of one to five or one to four I have found to give good results.

In practice, on the large scale, I have found that for a reservoir five (5) feet and six (6) inches diameter, having a central hub one (1) foot two (2) inches diameter, and a perforated stirrer two (2) feet long, placed radially, or nearly so, the stirrer having a diameter of about one (1) inch, the angular velocity of the stirrer should be that produced by about sixteen (16) revolutions of the shaft and stirrer-arms per minute, the seeds or meal being from six to ten inches deep above the stirrer.

Having described my invention and its method of operation generally, I refer to the accompanying drawings for the particular details of construction.

Figure 2:
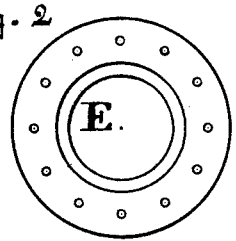
Figure 3:
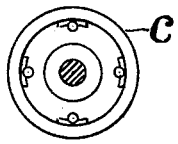
Figure 4:
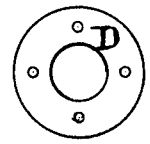

In the drawings, Figure 1 is a vertical section of the reservoir A, central hub C, gearing L, and packing-box M, showing also the perforated stirrer B, ordinary stirrer K, stirrer-arm J, shaft F, and valves G H I. Figs. 2, 3, and 4 show the detail parts for attaching the hub C to the reservoir A.

The reservoir A is constructed with double sides and bottom, for containing steam for heating the oil-seeds when desirable. Valve H serves to admit the steam and valve I to draw off the water of condensation. Ring E, Figs. 1 and 2, serves to unite the plates of the double bottom of the reservoir A, and also serves to hold the hub C, Figs. 1 and 3, central hub C being let into ring E a short distance. Hub C is further secured to the ring E by bolts passing through plate D, Figs. 1 and 4. Stirrers B and K are carried by and moved through the oil-seeds or meal by the arm J attached to shaft F, which is made to revolve at a suitable rate of speed by the gearing L. The direction of motion being such that the perforations in stirrer B lie in the rear of the stirrer, steam, being admitted by the valve, G passes through the centrally-located packing-box M to the perforations in stirrer B, by which it escapes to the cavity or wake formed within the body or mass of seeds or meal by the action of the moving stirrer, thereby coming into contact with the oil-seeds or meal in a diffused condition, and moistening the same in a uniform manner. Stirrer B should be located about two inches above the bottom of the reservoir A, and should be long enough to nearly reach the inside of reservoir A and the outside of hub B, leaving just room enough to insure freedom of motion. Stirrer K should have the same length, and should move close to the bottom of the reservoir A, so as to thoroughly move all the seeds or meal in contact with the heated bottom of the reservoir. The centrally-located packing-box M surrounds the end of the pipe leading from the valve G, and is arranged to admit a fibrous packing to make the connection steam-tight, while permitting the box M to revolve around the pipe freely. The depth of the oil-seeds or meal in the reservoir, when being operated on, should always be great enough to prevent the escape of the steam before it can be absorbed by the seeds or meal.

What I claim as my invention, and desire to secure by Letters Patent, is—

1. The process for uniformly moistening oleaginous seeds or the meal thereof for the extraction of oil therefrom, which consists in giving to the seeds or meal a rapid rate of velocity, in circles and up and down, and subjecting the seeds or meal while thus in motion to heated vapors introduced into the cavities or wakes formed amidst the body of the mass of seeds or meal during the rapid motions of the seed or meal, substantially as and for the purposes set forth.

2. The combination of the relatively-enlarged central hub C, the relatively-shortened arms of the perforated stirrer B, and the reservoir A, substantially as and for the purpose described.

3. The steam-stirrer B, provided with perforated horizontal arms, which are caused, by suitable gearing, to revolve between the walls of the reservoir A and the hub C, near the bottom of the reservoir containing the seeds or other oleaginous substances, substantially as described.

4. The combination of the reservoir A, partially surrounded with a steam-chamber, and provided with an enlarged hub, C, the central portion of which serves as a bearing-box for the shaft F, the steam-stirrer having perforated horizontal arms, which are caused to revolve between the wall of the reservoir A and the hub C, and suitable steam-supplying pipes and valves, substantially as described.

5. Pendent stirrers B and K, with perforated horizontal arms, which are set at different altitudes with respect to the bottom of the reservoir A, and both in near proximity to said bottom, and both provided with perforations for the discharge of steam backward and both revolving between the wall of the reservoir A and the enlarged hub C, substantially as described.

ALFRED B. LAWTHER.

Witnesses:
C. C. BONNEY,
CHARLES L. BONNEY.